US008554917B2

(12) United States Patent
Agarwala et al.

(10) Patent No.: US 8,554,917 B2
(45) Date of Patent: Oct. 8, 2013

(54) PERFORMANCE ISOLATION FOR STORAGE CLOUDS

(75) Inventors: Sandip Agarwala, Sunnyvale, CA (US); Richard J. Ayala, Jr., Medford, NJ (US); Sandeep Gopisetty, Morgan Hill, CA (US); Seshashayee S. Murthy, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 12/859,788

(22) Filed: Aug. 20, 2010

(65) Prior Publication Data

US 2012/0047265 A1    Feb. 23, 2012

(51) Int. Cl.
*G06F 15/173* (2006.01)

(52) U.S. Cl.
USPC ............................................... 709/226

(58) Field of Classification Search
USPC ............................................... 709/226
See application file for complete search history.

(56) References Cited

U.S. PATENT DOCUMENTS

| 6,950,874 | B2 | 9/2005 | Chang et al. | |
| 6,986,137 | B1 | 1/2006 | King et al. | |
| 7,140,020 | B2 * | 11/2006 | McCarthy et al. | 718/104 |
| 7,266,823 | B2 | 9/2007 | Alford, Jr. | |
| 7,725,559 | B2 | 5/2010 | Landis et al. | |
| 8,285,959 | B2 * | 10/2012 | Jess | 711/165 |
| 2001/0054133 | A1 * | 12/2001 | Murotani et al. | 711/114 |
| 2004/0260811 | A1 * | 12/2004 | Cherkasova | 709/225 |
| 2009/0171999 | A1 * | 7/2009 | McColl et al. | 707/101 |
| 2009/0241108 | A1 * | 9/2009 | Edwards et al. | 718/1 |
| 2010/0175107 | A1 | 7/2010 | Sugarbroad | |
| 2011/0126197 | A1 * | 5/2011 | Larsen et al. | 718/1 |
| 2011/0283017 | A1 * | 11/2011 | Alkhatib et al. | 709/244 |
| 2012/0060013 | A1 * | 3/2012 | Mukherjee | 711/204 |
| 2013/0097321 | A1 * | 4/2013 | Tumbde et al. | 709/226 |

OTHER PUBLICATIONS

Maitland, J., "Keeping Control Isn't Easy", Chapter 4: Cloud-Based Infrastructure, SearchCloudComputing.com, 13 pages, Oct. 2009.
Mell et al., "The NIST Definition of Cloud Computing", National Institute of Standards and Technology, Information Technology Laboratory, Version 15, Oct. 7, 2009, 2 pages.
Shieh, A., "Seawall: Performance Isolation for Cloud Datacenter Networks", presented Jun. 22, 2010 at the "2nd USENIX Workshop on Hot Topics in Cloud Computing" in Boston, MA, http://research.microsoft.com/en-us/UM/people/srikanth/data/hotcloud10_seawall.pdf.
Slides for "Seawall: Performance Isolation for Cloud Datacenter Networks" presentation, http://www.usenix.org/events/hotcloud10/tech/slides/shieh.pdf, Jun. 29, 2010.

* cited by examiner

*Primary Examiner* — Imad Hussain
(74) *Attorney, Agent, or Firm* — William E. Schiesser; Keohane & D'Alessandro, PLLC

(57) ABSTRACT

Embodiments of the present invention provide performance isolation for storage clouds. Under one embodiment, workloads across a storage cloud architecture are grouped into clusters based on administrator or system input. A performance isolation domain is then created for each of the clusters, with each of the performance isolation domains comprising a set of data stores associated with a set of storage subsystems and a set of data paths that connect the set of data stores to a set of clients. Thereafter, performance isolation is provided among a set of layers of the performance isolation domains. Such performance isolation is provided by (among other things): pooling data stores from separate performance isolation domains into separate pools; assigning the pools to device adapters, RAID controller, and the set of storage subsystems; preventing workloads on the device adapters from exceeding capacities of the device adapters; mapping the set of data stores to a set of Input/Output (I/O) servers based on an I/O capacity and I/O load of the set of I/O servers; and/or pairing ports of the set of I/O servers with ports of the set of storage subsystems, the pairing being based upon availability, connectivity, I/O load, and I/O capacity.

21 Claims, 6 Drawing Sheets

PERFORMANCE ISOLATION FOR STORAGE CLOUDS

TECHNICAL FIELD

The present invention generally relates to performance isolation. Specifically, the present invention relates to performance isolation for an enterprise storage cloud.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices.

An enterprise storage cloud is typically shared across multiple users and/or customers. This sharing may happen at different levels: at the file system level, at the network level, at the storage controller level, at the hard disk drive level, etc. In such a shared environment, a cloud management system needs to be appropriately configured such that the workload of one user does not have a negative impact on the performance of another user's workload. Current methods for performance isolation in a cloud environment are impromptu and often rely on over-provisioning of system resources, which results in lower system utilization and higher cost.

SUMMARY

Embodiments of the present invention provide for the systematic allocation of cloud resources to different users, and to configure such resource end-to-end in such a way that workloads of different users can co-exist without interfering with each other. Specifically, embodiments of the present invention create virtual isolation paths using policy-based placements of different workloads in shared storage resources. Under one embodiment of the present invention, workloads across a storage cloud architecture are grouped into clusters based on administrator or system input. A performance isolation domain is then created for each of the clusters, with each of the performance isolation domains comprising a set of data stores associated with a set of storage subsystems and a set of data paths that connect the set of data stores to a set of clients. Thereafter, performance isolation is provided among a set of layers of the performance isolation domains. Such performance isolation is provided by (among other things): pooling data stores from separate performance isolation domains into separate pools; assigning the pools to device adapters, Redundant Array of Independent Disks (RAID) controllers, and the set of storage subsystems; preventing workloads on the device adapters from exceeding capacities of the device adapters; mapping the set of data stores to a set of Input/Output (I/O) servers based on an I/O capacity and I/O load of the set of I/O servers; and/or pairing ports of the set of I/O servers with ports of the set of storage subsystems, the pairing being based upon availability, connectivity, I/O load, and I/O capacity.

A first aspect of the present invention provides a method for providing performance isolation for storage clouds, comprising: grouping workloads across a storage cloud architecture into clusters; creating a performance isolation domain for each of the clusters, each of the performance isolation domains comprising a set of data stores associated with a set of storage subsystems and a set of data paths that connect the set of data stores to a set of clients; and providing performance isolation among a set of layers of the performance isolation domains.

A second aspect of the present invention provides a system for providing performance isolation for storage clouds, comprising: a bus; a processor coupled to the bus; and a memory medium coupled to the bus, the memory medium comprising instructions to: group workloads across a storage cloud architecture into clusters; create a performance isolation domain for each of the clusters, each of the performance isolation domains comprising a set of data stores associated with a set of storage subsystems and a set of data paths that connect the set of data stores to a set of clients; and provide performance isolation among a set of layers of the performance isolation domains.

A third aspect of the present invention provides a computer program product for providing performance isolation for storage clouds, the computer program product comprising a computer readable storage media, and program instructions stored on the computer readable storage media, to: group workloads across a storage cloud architecture into clusters; create a performance isolation domain for each of the clusters, each of the performance isolation domains comprising a set of data stores associated with a set of storage subsystems and a set of data paths that connect the set of data stores to a set of clients; and provide performance isolation among a set of layers of the performance isolation domains.

A fourth aspect of the present invention provides a method for deploying a system for providing performance isolation for storage clouds, comprising: providing a computer infrastructure being operable to: group workloads across a storage cloud architecture into clusters; create a performance isolation domain for each of the clusters, each of the performance isolation domains comprising a set of data stores associated with a set of storage subsystems and a set of data paths that connect the set of data stores to a set of clients; and provide performance isolation among a set of layers of the performance isolation domains.

BRIEF DESCRIPTION OF THE DRAWINGS

These and other features of this invention will be more readily understood from the following detailed description of the various aspects of the invention taken in conjunction with the accompanying drawings in which.

Figure 1:
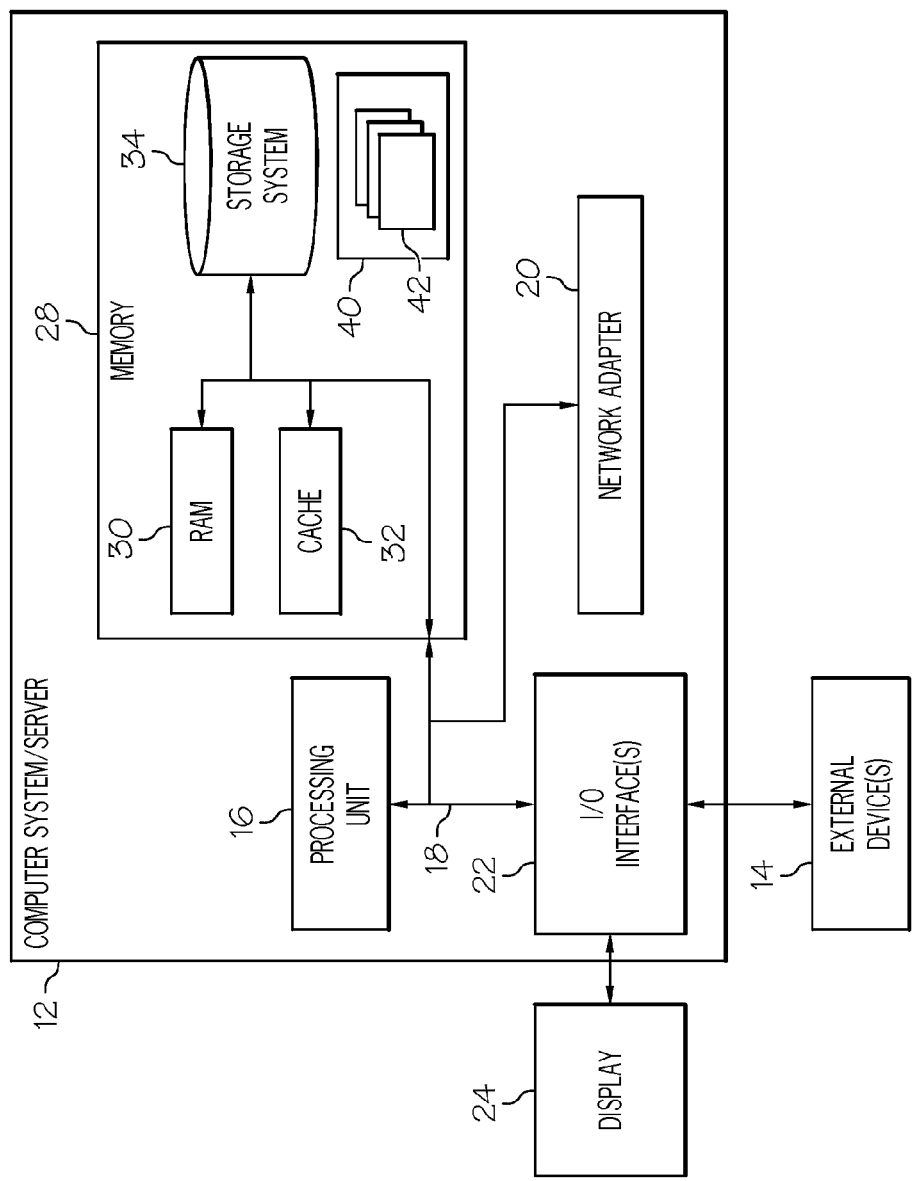
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the present invention provide for the systematic allocation of cloud resources to different users, and to configure such resources end-to-end in such a way that workloads of different users can co-exist without interfering with each other. Specifically, embodiments of the present invention create virtual isolation paths using policy-based placements of different workloads in shared storage resources. Under one embodiment of the present invention, workloads across a storage cloud architecture are grouped into clusters based on administrator or system input. A performance isolation domain is then created for each of the clusters, with each of the performance isolation domains comprising a set of data stores associated with a set of storage subsystems and a set of data paths that connect the set of data stores to a set of clients. Thereafter, performance isolation is provided among a set of layers of the performance isolation domains. Such performance isolation is provided by (among other things): pooling data stores from separate performance isolation domains into separate pools; assigning the pools to device adapters, RAID controller, and the set of storage subsystems; preventing workloads on the device adapters from exceeding capacities of the device adapters; mapping the set of data stores to a set of Input/Output (I/O) servers based on an I/O capacity and I/O load of the set of I/O servers; and/or pairing ports of the set of I/O servers with ports of the set of storage subsystems, the pairing being based upon availability, connectivity, I/O load and I/O capacity.

An increasingly popular model in enterprise cloud computing is to consolidate diverse clients' workloads in the same environment rather than isolating the workloads in separate physical IT infrastructures. Such consolidation helps in reducing cost by reducing resource wastage, optimizing power consumption, reducing floor space requirements, etc. While consolidation can have certain advantages, it can present drawbacks for system administrators who have to manage a greater number of workloads in a shared infrastructure. These workloads may have diverse requirements and can potentially interfere with each other while sharing I/O servers, interconnection fabric, storage subsystems, etc.

The embodiments of the present invention thus provide an approach that systematically allocates cloud resources to different users and configures them end-to-end in such a way that workloads of different users can co-exist without interfering with each other. As will be further discussed below, such embodiments provide for the creation of 'isolation domains' that create divisions between the workloads in a shared cloud environment. These divisions can be physical (e.g., the placement of two workloads in two different storage arrays) or logical (e.g., the placement of two workloads in two different storage pools in the same storage array).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
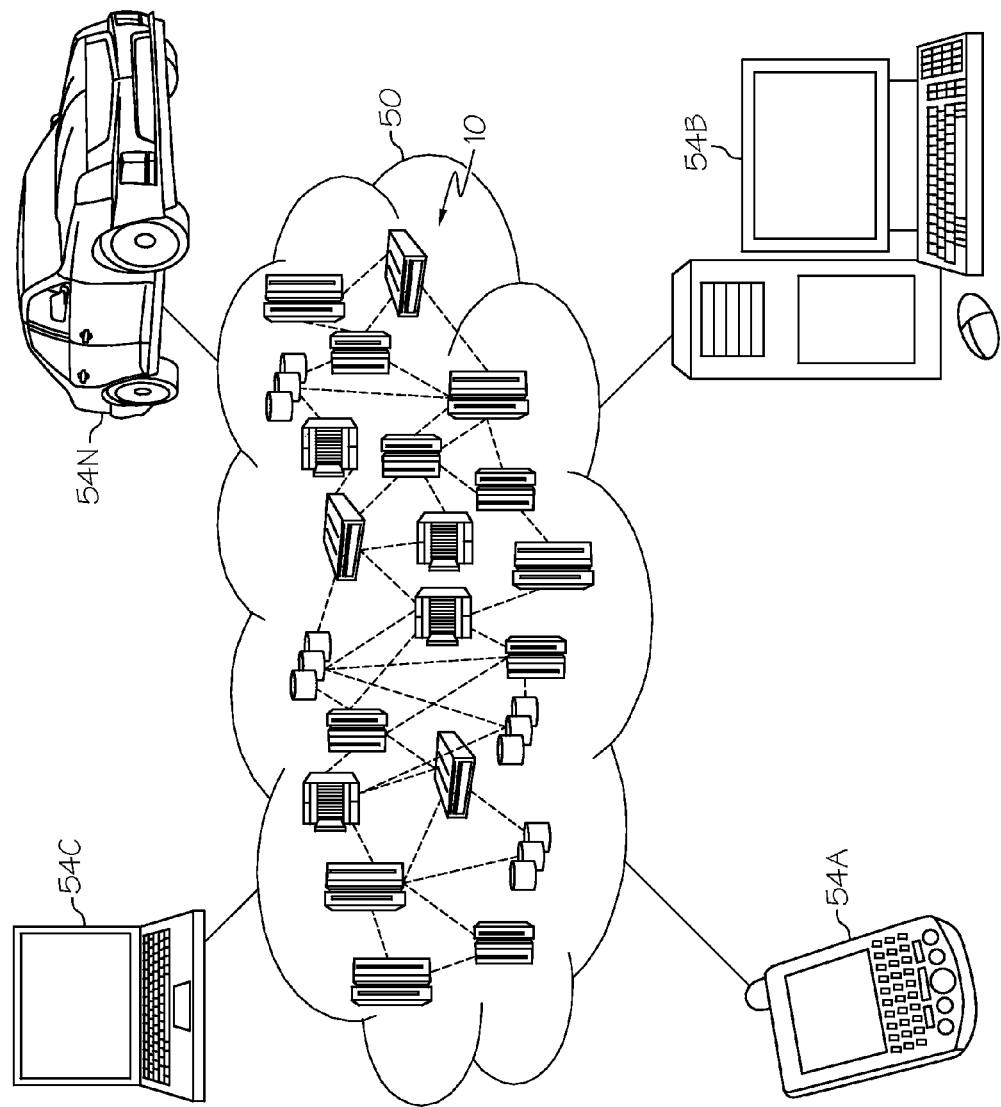
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
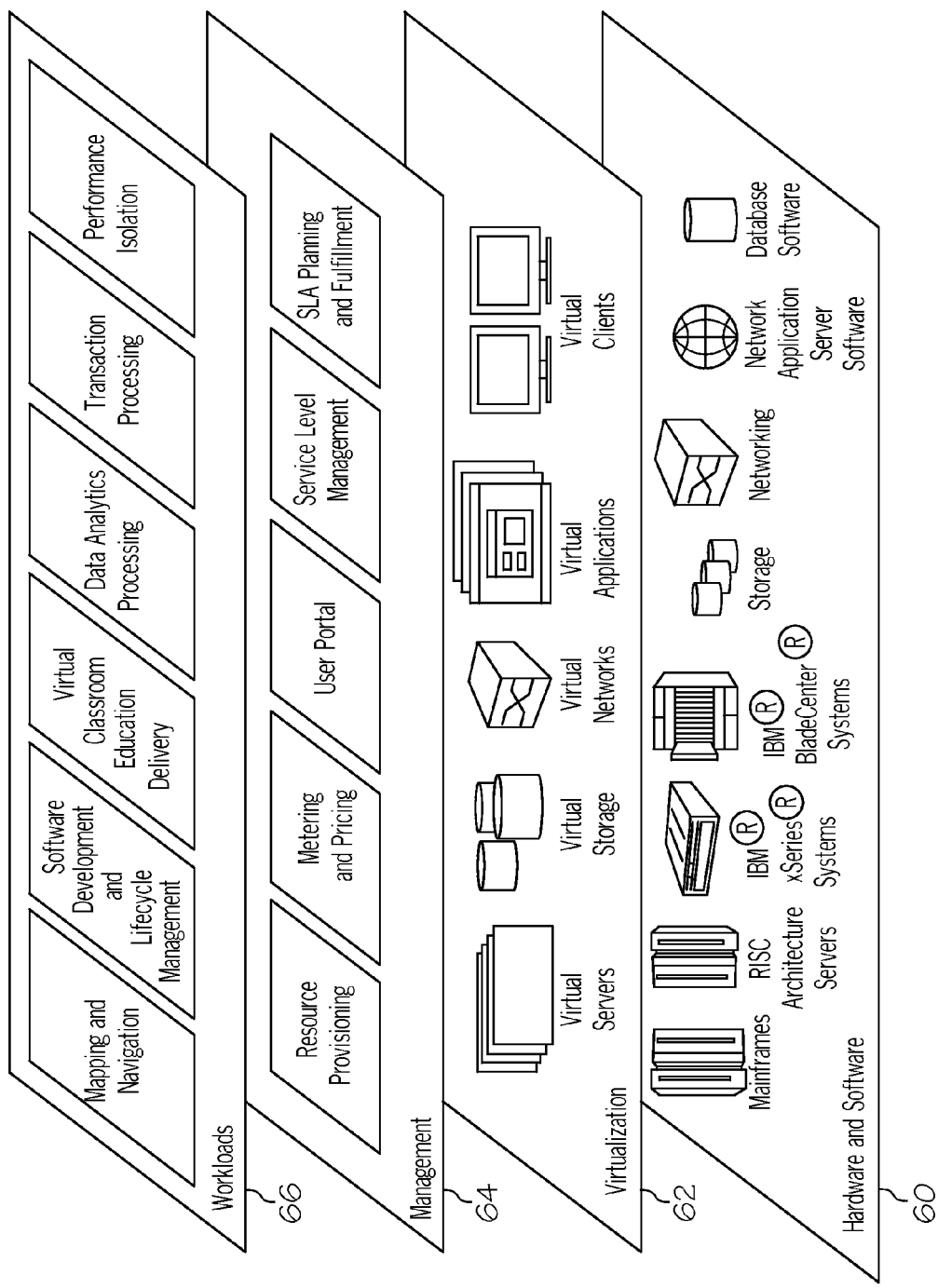
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized.

Examples of workloads and functions which may be provided from this layer include: mapping and navigation; software development and lifecycle management; virtual classroom education delivery; data analytics processing; transaction processing; and performance isolation. As mentioned above, all of the foregoing examples described with respect to FIG. 3 are illustrative only, and the invention is not limited to these examples.

It is understood all functions of the present invention as described herein are typically performed by performance isolation function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Figure 4:
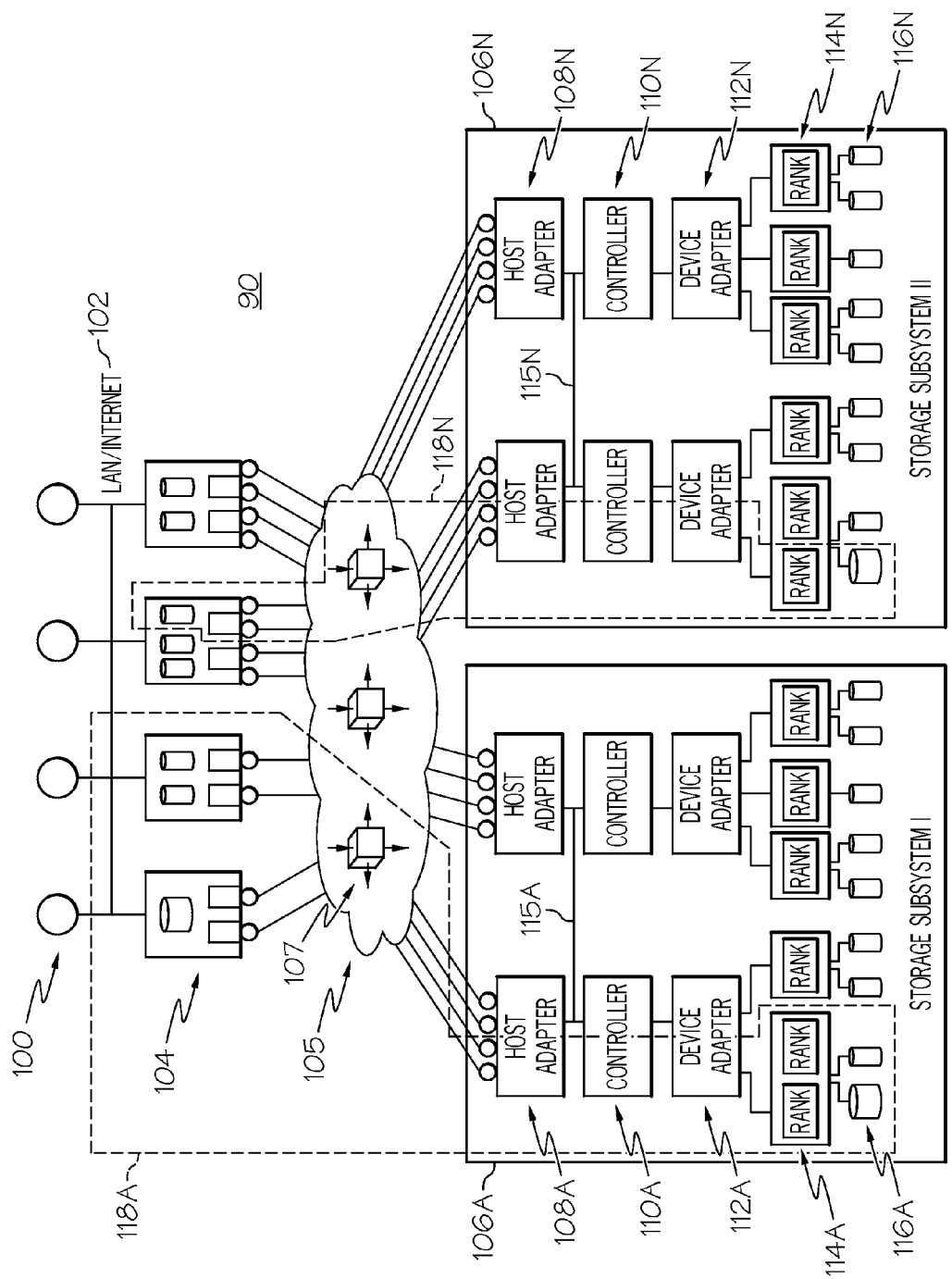
FIG. 4 depicts an architectural diagram according to an embodiment of the present invention.

Referring now to FIG. 4, an illustrative multi-layer, storage cloud architecture 90 according to an embodiment of the present invention is shown. As shown, a set (at least one) of clients 100 can communicate with a set of interface nodes 104 (e.g., General Parallel File System (GPFS) nodes) over a network connection 102 (e.g., LAN, WAN, etc.). Set of interface nodes 104 then communicate via interconnection fabric 105 (e.g., a SAN interconnection fabric having fiber channel switches 107) with a set of storage subsystems 106A-N. As further depicted, storage subsystems 106A-N each comprise host adapters 108A-N, controllers 110A-N, device adapters 112A-N, storage nodes 114A-N and data stores 116A-N (e.g., LUNs). As further shown, these components can communicate via interconnects 115A-N (e.g., fiber channel, Infiniband, etc.). Under the present invention, (and as will be discussed in conjunction with FIG. 5), a performance isolation engine will group workloads across storage cloud architecture 90 into a set of clusters 118-A-N. For each cluster 118A-N, a performance isolation domain is created for which performance isolation is provided. Further details of this process will be discussed in conjunction with FIG. 5.

Figure 5:
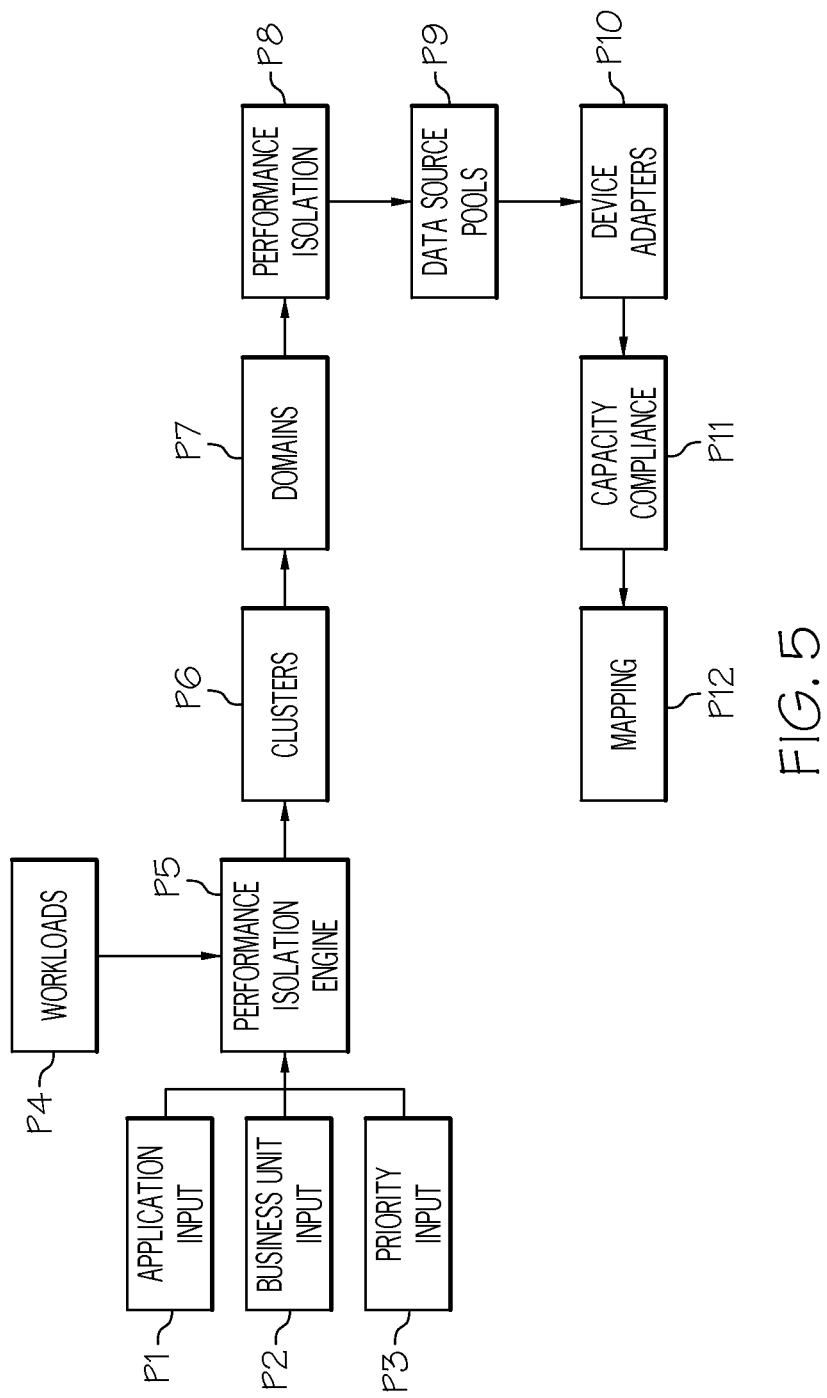
FIG. 5 depicts a process flow diagram according to an embodiment of the present invention.

Referring now to FIG. 5, a process flow diagram according to an embodiment of the present invention is shown. It is understood in advance that while performance isolation engine P5 can accommodate GPFS-based (General Parallel File System) storage clouds, it should be understood that it could provide similar functionality for any type of storage system. Previously, workloads were distributed across all available disks for performance and scalability reasons. However, since the amount of resource in any cloud is finite, one workload or a set of workloads can consume most of the resources and starve other workloads. Performance isolation engine P5 functions to (among other things) ensure that the execution of one workload doesn't starve other workloads. This is achieved by creating end-to-end performance isolation domains, where workload belonging to one domain doesn't impact the workload on other domains. It will be explained further below how performance isolation engine P5 works and how these domains are managed.

First, the workloads P4 are grouped into workload clusters P6 (shown as 118A-N in FIG. 4) based on system or administrator input. Along these lines, clusters P6 can be defined based upon various types of input. Clusters P8 can be defined based on input related to: types of applications P1 corresponding to workloads P4; business units P2 to which workloads P4, the priority P3 of workloads P4; and/or other characteristics. In any event, for clusters P6, performance isolation engine P5 creates performance isolation domains P7. Each domain P7 typically comprises (among other components) data stores (116A-N of FIG. 4) such as Logical Unit Numbers (LUNs), I/O data paths that connect data stores to clients (100 of FIG. 4). Resource sharing takes place at many different layers in SAN and GPFS. Such layers are illustrated in FIG. 4. In order to achieve end-to-end performance isolation P8, performance isolation engine P5 addresses isolation at every layer as follows:

i) At the storage subsystem level, LUNs belonging to different workload clusters P6 are created in different 'storage pools' P9. Performance isolation engine P5 makes sure that no two LUNs belonging to two different clusters P6 appear in the same pool. These pools are assigned to the 'device adapters' (DA) P10 that also act as the RAID controllers. As there is a limited number (typically 2-4) of DAs in most storage subsystems, a DA cannot be exclusively assigned to a storage pool in most cases. Performance isolation engine P5 does automatic assignment based on the load that different workloads are going to impose on the DAs.

Let $w_i^l$ be the average load imposed by 1 GB of workload 'i'.

Let $s_i$ be the size (i.e., capacity) of workload 'i'.

Let $w_i^l$ be the average load imposed by 1 GB of workload cluster 'c'.

$$W_c^l = \frac{\sum_{i \in c} w_i^l \cdot s_i}{\sum_{i \in c} s_i}$$

In order to achieve performance isolation, the load on each DA must not exceed its capacity P11. Performance isolation engine P5 solves the following optimization problem in order to derive assignment of the workloads to the DA:

$$(W_{c1}^i \ W_{c2}^i \ \ldots \ W_{cm}^i) \begin{pmatrix} A_{1,1} & \ldots & A_{1,n} \\ \vdots & \ddots & \vdots \\ A_{m,1} & \ldots & A_{m,n} \end{pmatrix} \leq \begin{pmatrix} W_1^d \\ \vdots \\ W_m^d \end{pmatrix}$$

$$0 \leq A_{i,j} \leq 1$$

$$\forall i \in \text{List of workload clusters}: \sum_j^{j \in \text{List of DAs}} A_{i,j} = 1$$

Cell $A_{i,j}$ in the assignment matrix indicates the fraction of workload 'i' placed in DA 'j'. $w_i^d W_j^d$ indicates the maximum load that can be handled by DA 'j'.

ii) For high volume workloads, a single I/O server may not be sufficient to handle the entire load. GPFS load balances I/O load from all workloads across several I/O servers within the cluster. This may cause one workload to impede the traffic of another workload. Performance isolation engine P5 addresses this issue by isolating I/O traffic of different workloads in different I/O servers. But as the number of I/O servers are typically smaller compared to the number of workloads, dedicated access is not possible. Performance isolation engine P5 uses the following code-based algorithm to assign I/O servers to the workloads and reduce interference as much as possible:

```
Let L_W be the sorted list (descending) of workloads based on their size
    (IOPS, volume, etc.)
Let L_s be the list of available I/O servers
for each W ∈ L_W
    while 'W' is not completely assigned
        Assign 'W' to the first available server 's' in L_s
        if 's' doesn't have enough available I/O capacity
            remove 's' from L_s
        endif
    end while
    Move 's' at the end of list L_s
end for
``` iii) Storage LUNs are made available to I/O servers through a process of LUN mapping/masking P12. LUN mapping configures the data paths through which I/O servers can communicate with the storage LUNs. Each data path comprises a fiber channel (FC) port pair: one port in the I/O server and the other port in the storage subsystem that contains the LUN. Modern storage subsystems typically have multiple fiber channel ports, which are controlled by Host Adapters (HAs). Arbitrary pairing of storage subsystem ports with I/O server ports can result in poor isolation of I/O traffic of workloads belonging to different clusters. Performance isolation engine P5 assigns storage LUNs to storage subsystem ports based on availability, connectivity, I/O load, and I/O capacity (of the I/O servers). As the number of workloads (or workload clusters) may exceed the number of HAs and/or storage subsystem FC ports, it may not be possible to dedicate an HA or a port to a single workload. During the mapping process, performance isolation engine P5 tries to minimize the overlap in data paths of different workload clusters using the following code-based algorithm:

```
for each W ∈ List of workload clusters
    L_HA: Sorted list of HAs based on availability capacity
    Let P_assigned be the list (sorted based on available capacity) of
        storage subsystem FC ports used in mapping of 'W'
    for each storage LUNs '/' ∈ W
        Let 's' be the server(s) that need to access storage LUN
    '/'
        Find a port 'p' in P_assigned with minimum availability that is
            connected to 's' and can accommodate I/O load due to '/'.
        if 'p' exists
            Create a mapping pair (p, s) for storage LUN '/'
        else
            Let L_ports be the list (sorted based on available
                capacity) of storage subsystem FC ports that are
                connected to 's'.
            Find a port p' in L_ports with highest availability and
                can accommodate I/O load due to '/'
            if p' exists
                Create a mapping pair (p', s) for storage LUN '/'
                Add p' to P_assigned
            endif
        endif
    endfor
endfor
```

There can be several variants of the above algorithm depending on the goals and requirements of the workloads P4 and the administrators. The above algorithm tries to separate out I/O traffic of each workload cluster P6 at the HA level and at the subsystem FC port level.

Figure 6:
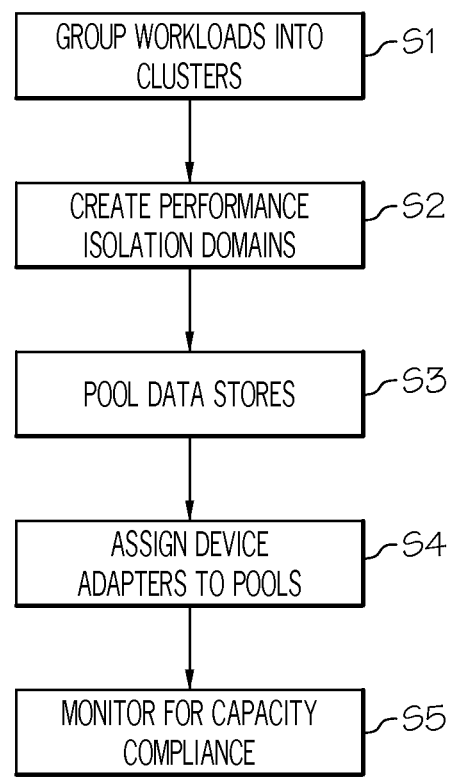
FIG. 6 depicts a method flow diagram according to an embodiment of the present invention.

Referring now to FIG. 6, a method flow diagram according embodiments to the present invention is shown. In step S1, workloads across a storage cloud architecture are grouped into clusters. Such grouping typically occurs based upon administrator and/or system input such as input relating to at least one of the following: types of applications corresponding to the workloads, business units generating the workloads, or priority of the workloads. In step S2, a performance isolation domain is created for each of the clusters, each of the performance isolation domains comprising a set of data stores associated with a set of storage subsystems and a set of data paths that connect the set of data stores to a set of clients. For each of a set of layers of performance isolation domains, performance isolation is now provided. Specifically, in step S3, data stores from separate performance isolation domains are pooled into separate pools. In step S4, the pools are assigned to device adapters, RAID controllers, and the set of storage subsystems. In step S5, workloads on the device adapters are prevented from exceeding the capacities of the device adapters (e.g., capacity compliance).

While shown and described herein as a performance isolation solution, it is understood that the invention further provides various alternative embodiments. For example, in one embodiment, the invention provides a computer-readable/useable medium that includes computer program code to enable a computer infrastructure to provide performance isolation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide performance isolation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for performance isolation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing performance isolation for storage clouds, comprising:
grouping workloads across a storage cloud architecture into clusters;
creating a performance isolation domain for each of the clusters, each of the performance isolation domains comprising a set of data stores associated with a set of storage subsystems and a set of data paths that connect the set of data stores to a set of clients;
providing performance isolation among a set of layers of the performance isolation domains;
pooling data stores from separate performance isolation domains into separate pools; and
assigning the pools to device adapters, RAID controllers, and the set of storage subsystems, the assigning being based on a goal of minimizing an overlap in data paths of each cluster of the clusters.

2. The method of claim 1, the grouping being based on input.

3. The method of claim 2, the input relating to at least one of the following: types of applications corresponding to the workloads, business units generating the workloads, or priority of the workloads.

4. The method of claim 1, the set of data stores comprising a set of Logical Unit Numbers (LUNs).

5. The method of claim 1, the assigning comprising:
assigning the pools to device adapters, RAID controllers, and the set of storage subsystems according to a formulaic calculation comprising:

$$w_c^l = \frac{\sum_{i \in c} w_i^l \cdot s_i}{\sum_{i \in c} s_i}$$

wherein $w_i^l$ is an average load imposed by 1 GB of a workload 'i', $s_i$ is a size of the workload 'i', and $w_c^l$ is the average load imposed by 1 GB of workload cluster 'c'.

6. The method of claim 5, the providing further comprising preventing workloads on the device adapters from exceeding capacities of the device adapters.

7. The method of claim 1, further comprising mapping the set of data stores to a set of Input/Output (I/O) servers based on an I/O capacity and I/O load of the set of I/O servers.

8. The method of claim 7, the mapping comprising pairing ports of the set of I/O servers with ports of the set of storage subsystems, the pairing being based upon availability, connectivity, I/O load and I/O capacity.

9. A system for providing performance isolation for storage clouds, comprising:
a bus;
a processor coupled to the bus; and
a memory medium coupled to the bus, the memory medium comprising instructions to:
group workloads across a storage cloud architecture into clusters;
create a performance isolation domain for each of the clusters, each of the performance isolation domains comprising a set of data stores associated with a set of storage subsystems and a set of data paths that connect the set of data stores to a set of clients; and
provide performance isolation among a set of layers of the performance isolation domains;
pool data stores from separate performance isolation domains into separate pools;
assign the pools to device adapters, RAID controllers, and the set of storage subsystems according to a formulaic calculation comprising:

$$w_c^l = \frac{\sum_{i \in c} w_i^l \cdot s_i}{\sum_{i \in c} s_i}$$

wherein $w_i^l$ is an average load imposed by 1 GB of a workload 'i', $s_i$ is a size of the workload 'i', and $w_c^l$ is the average load imposed by 1 GB of workload cluster 'c'.

10. The system of claim 9, the grouping being based on input relating to at least one of the following: types of applications corresponding to the workloads, business units generating the workloads, or priority of the workloads.

11. The system of claim 9, the set of data stores comprising a set of Logical Unit Numbers (LUNs).

12. The system of claim 9, the memory medium further comprising instructions to prevent workloads on the device adapters from exceeding capacities of the device adapters.

13. The system of claim 9, the memory medium further comprising instructions to map the set of data stores to a set of Input/Output (I/O) servers based on an I/O capacity and an I/O load of the set of I/O servers.

14. The system of claim 13, the memory medium further comprising instructions to pair ports of the set of I/O servers with ports of the set of storage subsystems, the pairing being based upon availability, connectivity, I/O capacity, and I/O load.

15. A computer program product for providing performance isolation for storage clouds, the computer program product comprising a non-transitory computer readable storage medium, and program instructions stored on the non-transitory computer readable storage medium, to:
group workloads across a storage cloud architecture into clusters;
create a performance isolation domain for each of the clusters, each of the performance isolation domains comprising a set of data stores associated with a set of storage subsystems and a set of data paths that connect the set of data stores to a set of clients;
provide performance isolation among a set of layers of the performance isolation domains;
pool data stores from separate performance isolation domains into separate pools;
assign the pools to device adapters, RAID controllers, and the set of storage subsystems according to a formulaic calculation comprising:

$$w_c^l = \frac{\sum_{i \in c} w_i^l \cdot s_i}{\sum_{i \in c} s_i}$$

wherein $w_i^l$ is an average load imposed by 1 GB of a workload 'i', $s_i$ is a size of the workload 'i', and $w_c^l$ is the average load imposed by 1 GB of workload cluster 'c'.

16. The computer program product of claim 15, the grouping being based on input relating to at least one of the following: types of applications corresponding to the workloads, business units generating the workloads, or priority of the workloads.

17. The computer program product of claim 15, the set of data stores comprising a set of Logical Unit Numbers (LUNs).

18. The computer program product of claim 15, the memory medium further comprising instructions to prevent workloads on the device adapters from exceeding capacities of the device adapters.

19. The computer program product of claim 15, the memory medium further comprising instructions to map the set of data stores to a set of Input/Output (I/O) servers based on an I/O capacity and an I/O load of the set of I/O servers.

20. The computer program product of claim 19, the memory medium further comprising instructions to pair ports of the set of I/O servers with ports of the set of storage subsystems, the pairing being based upon availability, connectivity, I/O capacity, and I/O load.

21. A method for deploying a system for providing performance isolation for storage clouds, comprising:
providing a computer infrastructure being operable to:
group workloads across a storage cloud architecture into clusters;
create a performance isolation domain for each of the clusters, each of the performance isolation domains comprising a set of data stores associated with a set of storage subsystems and a set of data paths that connect the set of data stores to a set of clients;

provide performance isolation among a set of layers of the performance isolation domains;
pool data stores from separate performance isolation domains into separate pools;
assign the pools to device adapters, RAID controllers, and the set of storage subsystems according to a formulaic calculation comprising:

$$w_c^l = \frac{\sum_{i \in c} w_i^l \cdot s_i}{\sum_{i \in c} s_i}$$

wherein $w_i^l$ is an average load imposed by 1 GB of a workload 'i', $s_i$ is a size of the workload 'i', and $w_c^l$ is the average load imposed by 1 GB of workload cluster 'c'.

* * * * *